United States Patent [19]
Walk et al.

[11] 3,822,649
[45] July 9, 1974

[54] RAIL-RUBBER MINE CAR

[75] Inventors: Howard J. Walk; Ervin I. Pietsch, both of Saint Charles; Garth R. Smith, Saint Peters, all of Mo.

[73] Assignee: ACF Industries, Incorporated, New York, N.Y.

[22] Filed: June 27, 1973

[21] Appl. No.: 374,015

[52] U.S. Cl............................. 105/215 C, 105/211
[51] Int. Cl............................................ B61f 13/00
[58] Field of Search.... 105/178, 211, 215 R, 215 C, 105/364

[56] References Cited
UNITED STATES PATENTS

| | | | |
|---|---|---|---|
| 2,021,075 | 11/1935 | McGinness...................... | 105/215 C |
| 2,140,121 | 12/1938 | Tomkins ......................... | 105/215 C |
| 3,353,504 | 11/1967 | Kersey et al. ................... | 105/215 C |
| 3,717,108 | 2/1973 | Thompson Jr. ................. | 105/215 C |

*Primary Examiner*—M. Henson Wood, Jr.
*Assistant Examiner*—John J. Love
*Attorney, Agent, or Firm*—Henry W. Cummings

[57] ABSTRACT

In accordance with the present invention a rail-rubber mine car is provided having rail wheels and rubber tire wheels on the car for moving the car close to the mining operation. The rubber wheels are movable between a lower position wherein the car is supported by the rubber tires and an upper position for running on rails. The car preferably comprises two rubber tires on each side of the car which are pivotally mounted upon yokes at opposite ends of the car. The distal ends of the yokes for the respective wheels are located at about the mid point of the car and can be raised and lowered by the operator without walking to opposite ends of the car. An automatic locking device is provided which urges the yokes into the locked position. A spring assist is provided to aid the operator in raising the rubber tires into the upper position. Various shaped bed contours may be utilized to provide a car with or without sides. A plurality of stake pockets may be provided around the circumference of the bed sections without sides to allow the use of removable side sections. Spacers may be provided on the axles to allow use of the car on a variety of track gauges.

26 Claims, 16 Drawing Figures

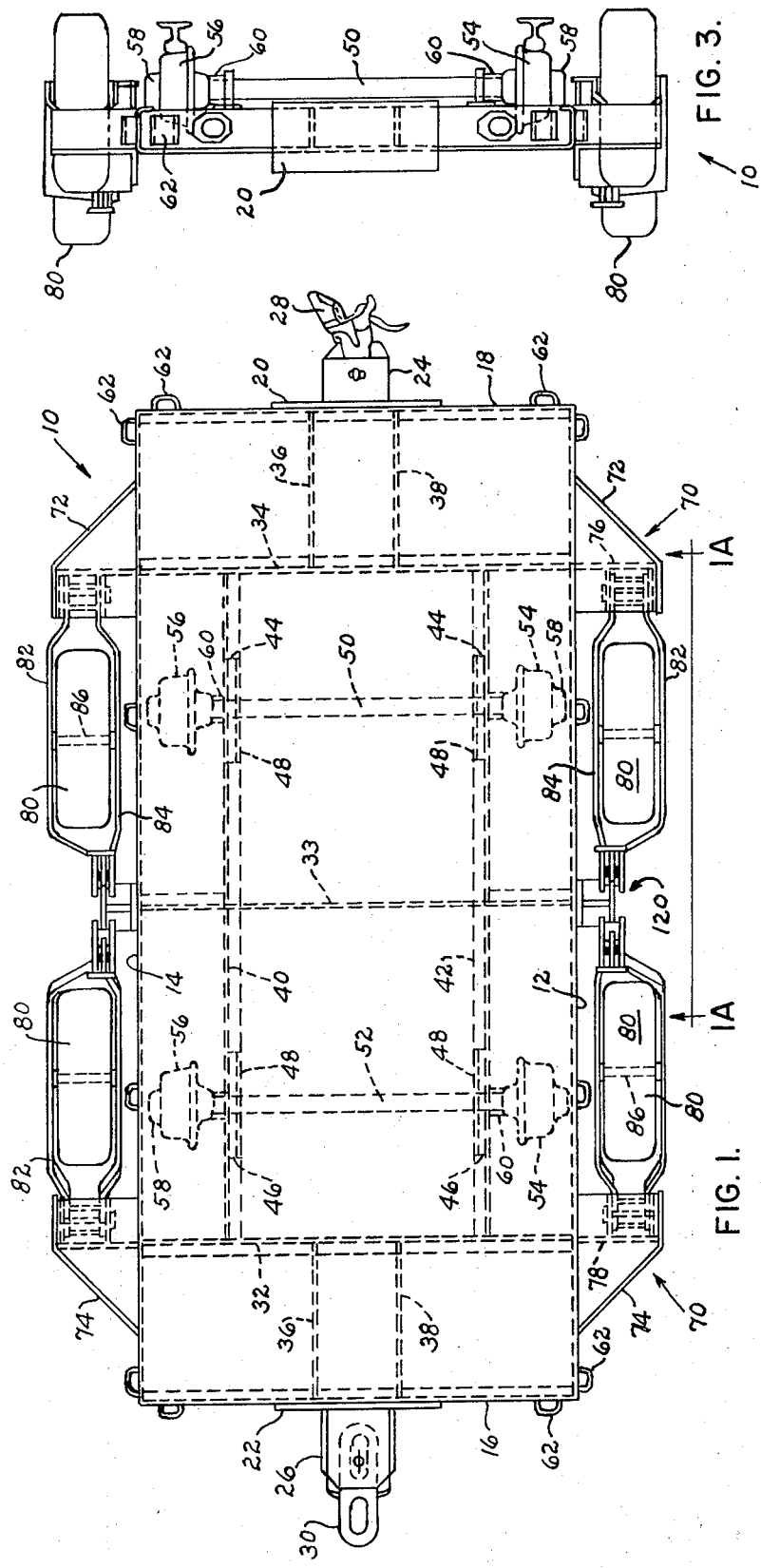

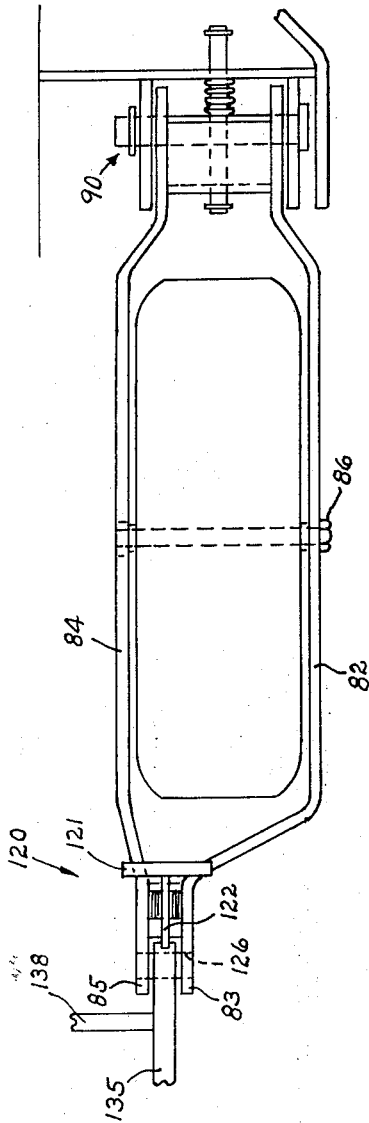
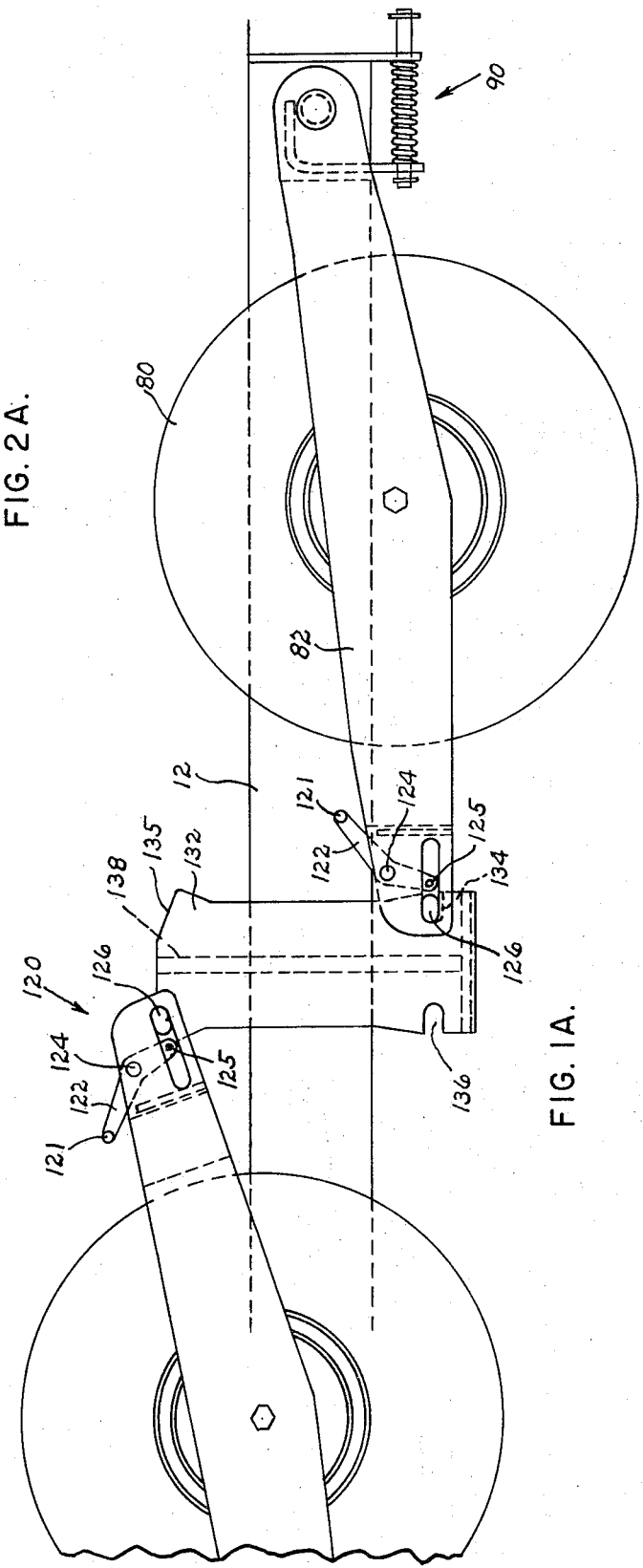

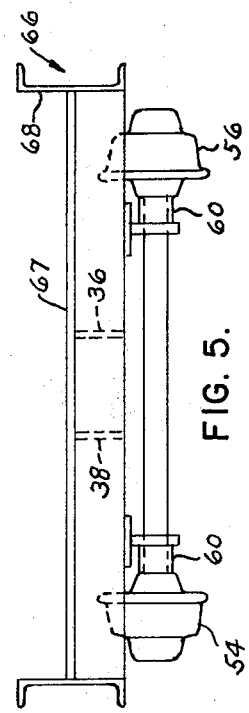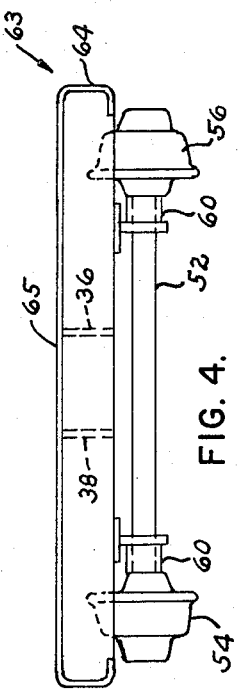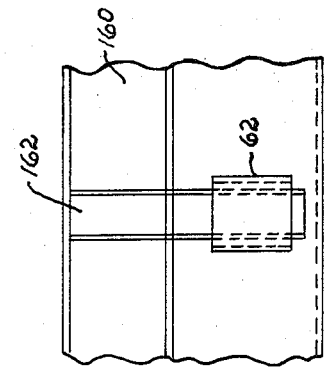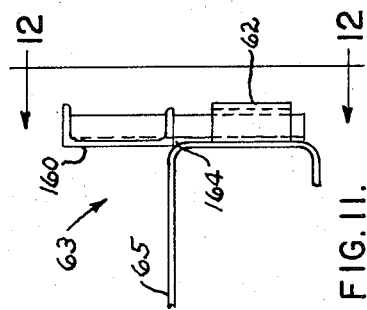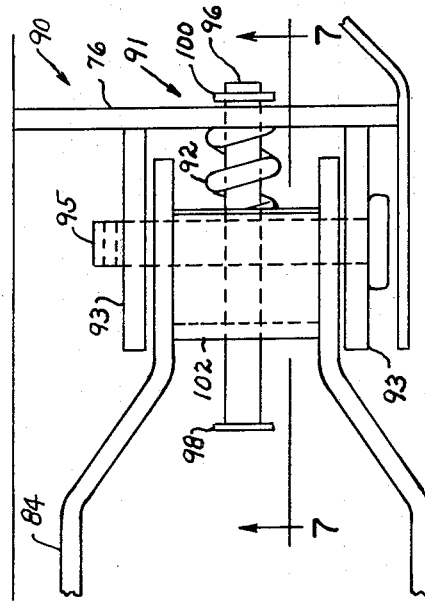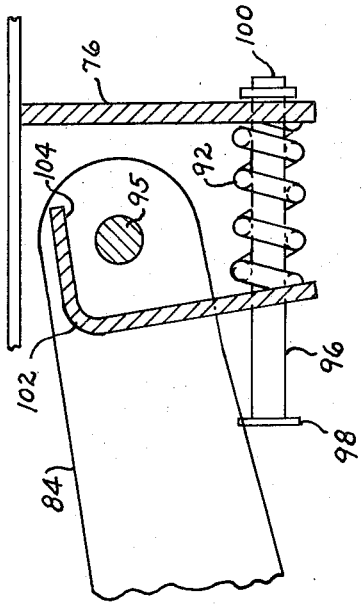

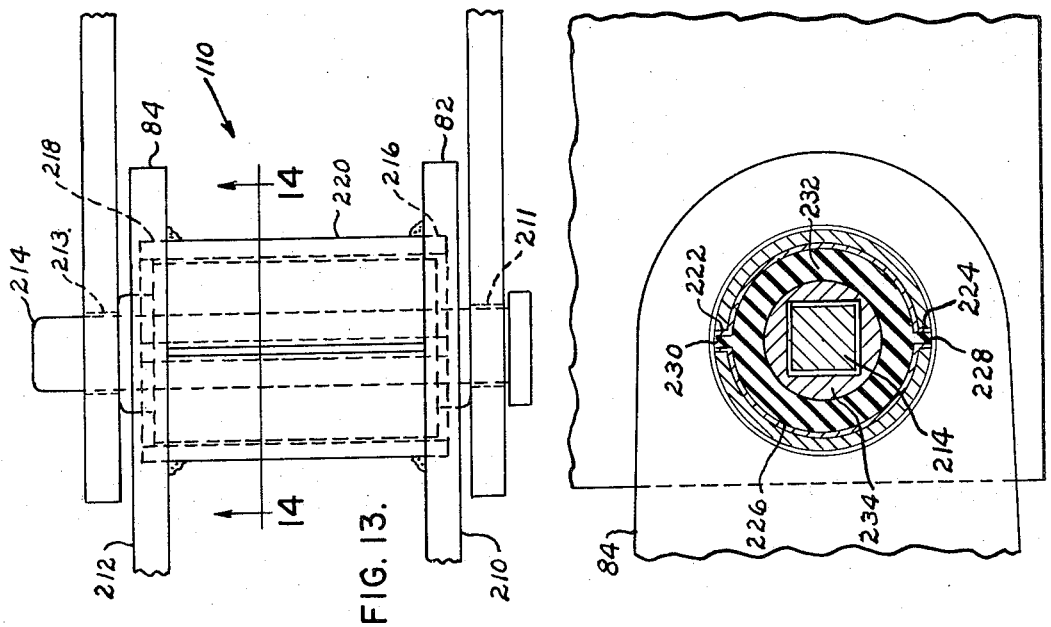
FIG. 13.
FIG. 14.
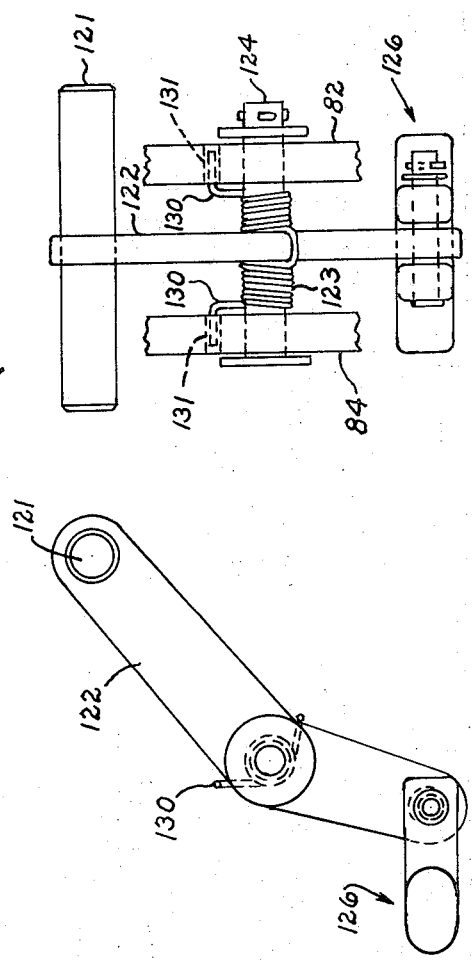
FIG. 8.
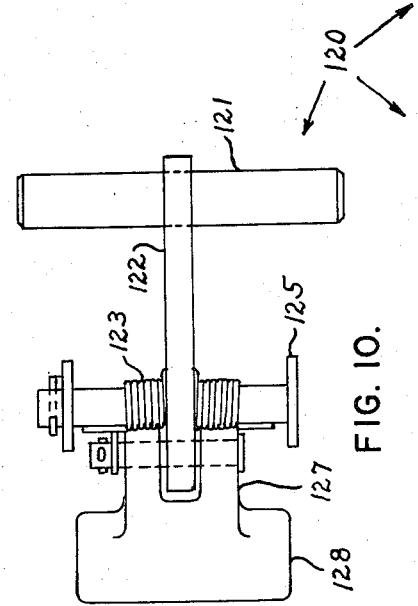
FIG. 10.
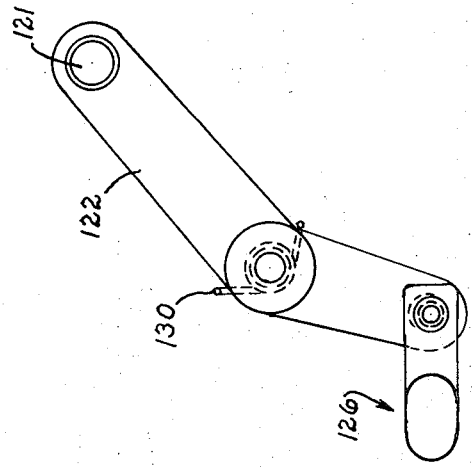
FIG. 9.

RAIL-RUBBER MINE CAR

BACKGROUND OF THE INVENTION

This invention relates to mine cars.

In many mines where a rail track is provided for cars to carry out the mined material, the track is considerably removed from where the actual mining is taking place. However, it is desirable to have cars get as close to the mining operation as possible. One use of mine cars is to remove the mined material. Secondly, the miners require heavy supplies and apparatus which are difficult to carry. Mine cars which carry such supplies and apparatus are often called supply cars.

It therefore is an object of the present invention to provide a mine car which can run on the mine rail track up to the end of the track and then can move farther into the mine upon rubber tires to get close to the mining operation.

It is another object of the present invention to provide a rail-rubber mine car which can be utilized on a variety of mine track gauges.

It is another object of the present invention to provide a locking arrangement to hold the rubber tires in the up position when the car is running on rails and in the down position when the car is traveling between the track and the mining operation.

It is another object of the present invention to provide an assist to aid the operator in raising the rubber tires to the up position.

It is another object of the present invention to provide a locking arrangement whereby the rubber tire supports are biased into the locked position.

It is another object of the present invention to provide a rail rubber car wherein the rubber tires are supported on both ends of their yoke support.

Other objects will be apparent from the following description and drawings.

THE DRAWINGS

FIG. 1 is a top view of the rail-rubber car of the present invention;

FIG. 1A is an enlarged side elevational view along the line 1A—1A of FIG. 1;

FIG. 2 is a side elevational view of the rail-rubber car of the present invention;

FIG. 2A is an enlarged top view along the line 2A—2A of FIG. 2;

FIG. 3 is an end view of the rail-rubber car of the present invention;

FIG. 4 is an end view illustrating one type of bedding for the rail-rubber car of the present invention;

FIG. 5 is an end view illustrating another type of bedding for the rail-rubber car of the present invention;

FIG. 6 is a top view illustrating the mounting of the yoke supports for the rubber tires and one type of spring assist which may be used in the rail-rubber car of the present invention;

FIG. 7 is a view along the lines 7—7 in FIG. 6;

FIG. 8 is a front elevational view of the locking arrangement for the rail-rubber car of the present invention;

FIG. 9 is a side elevation of the locking arrangement for the rail-rubber car of the present invention;

FIG. 10 is a top view of the locking arrangement for the rail-rubber car of the present invention;

FIG. 11 is an end view illustrating how the bed sections are affixed to the car by means of the stake pockets;

FIG. 12 is a side view along the line 12—12 in FIG. 11.

FIG. 13 is a top view of a torsion spring assist to aid the operator in raising the yokes in the rail-rubber car of the present invention; and FIG. 14 is a view along the line 14—14 in FIG. 13.

SUMMARY OF THE INVENTION

In accordance with the present invention a rail-rubber mine car is provided having rail wheels and rubber tire wheels on the car for moving the car close to the mining operation. The rubber wheels are movable between a lower position wherein the car is supported by the rubber tires and an upper position for running on rails. The car preferably comprises two rubber tires on each side of the car which are pivotally mounted upon yokes at opposite ends of the car. The distal ends of the yokes for the respective wheels are located at about the mid point of the car and can be raised and lowered by the operator without walking to opposite ends of the car. An automatic locking device is provided which urges the yokes into the locked position. A spring assist is provided to aid the operator in raising the rubber tires into the upper position. Various shaped bed contours may be utilized to provide a car with or without sides. A plurality of stake pockets may be provided around the circumference of the bed sections without sides to allow the use of removable side sections. Spacers may be provided on the axles to allow use of the car on a variety of track gauges.

DETAILED DESCRIPTION OF THE INVENTION

The rail-rubber mine supply car is indicated in the drawings generally at 10. The car includes side plates 12 and 14 and end plates 16 and 18. Mounted on the end plates are coupler mounting plates 20 and 22 and coupler pockets 24 and 26. Appropriate couplers may be provided in the coupler pockets, for example, an automatic coupler 28 may be utilized. Alternatively, a pin and link type coupler 30 may be utilized. The construction of the coupler pockets and couplers is well known in the art.

The car preferably has transversely extending plates 32, 33 and 34 appropriately fixed, for example, by welding to the side plates 12 and 14. Also, if desired, reinforcing plates 36 and 38 may be provided extending longitudinally of the car between end plates 16 and 18 and the transverse plates 32 and 34.

In addition, longitudinally extending plates or channels 40 and 42 are provided having openings therein 44 and 46 into which are placed journal plates 48. Axles 50, 52 having rail wheels 54 and 56 affixed thereto are journaled in the journal plates. Journal bearings 58 of known construction are provided between axles 50 and wheels 54 and 56. Preferably spacers 60 are provided of varying widths to allow the use of the frame design and wheels for various track gauges. For example, with appropriate spacers track gauges of 42, 44 and 48 inches may be utilized.

Bed sections of desired shape may be appropriately affixed to the frame structure, preferably by welding.

For example, as shown in FIG. 4, a channel type bed section 63 may be utilized having foreshortened sides 64 and providing a floor 65. A plurality of stake pockets 62 may be provided at the end and side portions of the car into which stakes may be removably fitted therein. For example, as shown in FIGS. 11 and 12, channel-shaped car sides 160 are illustrated having side stakes 162 formed thereon which engage stake pockets 62. The car sides are supported by the bed section as indicated at 164. Curved sides may be utilized if desired. Alternatively, as shown in FIG. 5, a channel-shaped bed section 66 may be utilized having channel-shaped bed sides 68 integral with bed section 67. Other bed section contours will be apparent to those skilled in the art.

Means for mounting the rubber tires is indicated generally at 70. This support structure comprises plates 72 and 74 and reinforcing plates 76 and 78 appropriately fixed to the side of the car, for example, by welding. The rubber tires 80 are mounted upon yokes 82 and 84 by means of a pin 86 extending between the yokes.

Resilient assist means 90 are preferably provided. In one embodiment shown in FIGS. 6 and 7 the resilient means comprises a spring assembly 91 including spring 92 mounted upon a rod 96 having a head 98 and a washer 100 which in turn is mounted on end plate 76. Spring assembly 91 is affixed to end plate 76 by brackets 93 and spring assembly 91 is pivoted about pin 95. A spring plate 102 is welded or otherwise appropriately affixed to yokes 82 and 84. Plate 102 has a generally horizontally extending portion 104 and a generally vertical portion 106. Vertical portion 106 engages spring 92.

It will be apparent that when the operator lifts the distal end of yokes 82 and 84 the spring will urge the yokes upward and aid the operator in raising the rubber tires to the upper position.

In another embodiment of the present invention shown in FIGS. 13 and 14, a torsion spring indicated generally at 110 is mounted between yokes 82 and 84. A square pin 214 is placed in square openings 211 and 213 in vertical plates 210 and 212. Yokes 82 and 84 are provided with openings 216 and 218. A tubular housing 220 having detents thereon 222 and 224 is welded to yokes 82 and 84 adjacent openings 216 and 218. Another tubular member 226 has transversely extending keys 228, 230 which engage detents 222 and 224 in housing 220. Thus housing 220 becomes essentially integral with yokes 82 and 84. A torsion spring 232 made of elastomeric material is provided between a mounting core 234 and the tube 226. Mounting core 234 engages and becomes essentially integral with pin 214. Thus torsion spring 232 urges yokes 82 and 84 to rotate counterclockwise in FIG. 14 and thus aid the operator in raising the yokes to the up position shown in FIG. 2. Other resilient devices which may be used to aid in raising the yokes to the up position will be apparent to those skilled in the art.

It will be apparent that yokes 82 and 84 near the center portion of the car side converge as indicated at 83 and 85, as shown in FIG. 2A. Locking means indicated generally at 120 are provided on the yokes. The locking means, for example, may comprise a handle 121 rigidly attached to a locking lever 122, for example, by welding. A pivot pin 124 is journaled in lever 122 and in yokes 82 and 84. A spring 123 is mounted about pin 124 so as to urge lug 126 into the outwardly extending position in the direction of the arrow as shown in FIG. 9. Yokes 82 and 84 maintain spring 123 on pin 124.

Spring ears 130 fit through holes 131 in yokes 82 and 84 to keep the spring from turning thus providing the bias force to keep locking lug 126 in the locked position. A pin 125 having an appropriate head and cotter is provided to hold the locking lug in place. It will be apparent from FIG. 10 that locking lug 126 has a portion of small cross section 127 and a large engaging portion 128.

Considering now the operation of the locking arrangement 120, assuming that the yokes are locked into the down position shown in the right hand side of FIG. 2, a fixed lock member 132 is provided having slots at the bottom 134, 136 adapted to be engaged by locking lugs 126. Reinforcing plates 138 and 140 are provided, both of which are appropriately affixed to the car sides 12 and 14, for example, by welding. In order to raise the rubber wheels, the operator moves the handle 121 from right to left as shown in FIGS. 9 and 10 to disengage the locking lug 126 from slot 134 in fixed locking member 132. The operator then can raise the yokes with the aid of spring assist 90. When the upper surface 135 of the fixed locking member 132 is reached the operator allows the locking lug 126 to assume a normal position that it would assume under the bias of spring 123. Thus, fixed member 132 supports the rubber tires in the upper position when the car is moved on rail wheels 54 and 56. In this position the rubber tires are free to move even further away from the ground surface if the rubber tires strike an object laying along the track during rail transit. This freedom of movement prevents the car from being derailed when such an object is struck by the rubber tires.

In order to move the rubber tires to the lower position the operator merely grasps the handle and moves the locking lever 122 against the bias of spring 123 until such time as the yokes can be lowered and then allow the locking lug 126 to engage the slots 134, 136 in fixed member 132.

While the rail rubber car of the present invention is primarily designed as a supply car to carrying mining apparatus and tools to the point where mining is being carried out, cars according to the design of the present invention may also be utilized to carry mined materials. In this event an embodiment of the car would be utilized having sides, for example, along the lines shown in FIG. 5 and the entire structure would be made relatively rugged.

What is claimed is:

1. A rail-rubber mine car comprising: end and side members joined together to define a generally rectangular structure; a generally transversely extending bed section affixed to said structure adapted to support mining tools and apparatus and/or mined materials; a pair of transversely extending axles rotatably affixed to said structure; rail wheels affixed to said axles adapted to run on tracks; yokes having tires affixed thereto pivotally mounted along the sides of the car so as to face each other; a fixed locking member mounted on each of said side members at about the center of the car; said locking member having a contour to provide an engaging surface in a lower portion thereof and an engaging surface at an upper portion thereof; yoke locking means affixed to said yokes; said yoke locking means comprising a locking lug adapted to engage said fixed locking member in a lower position thereof whereby said tires are adapted to support said car on the ground or mine floor, and in an upper position whereby said tires are supported partly by the fixed locking member and said car is supported by said rail wheels.

2. A rail-rubber mine car according to claim 1 wherein a spring assist assembly is provided to aid the operator in moving said yokes from the lower to the upper position.

3. A rail-rubber mine car according to claim 2 wherein said yoke locking means is resiliently biased toward the locked position.

4. A rail-rubber mine car according to claim 2 wherein said spring assist is a compression spring.

5. A rail-rubber mine car according to claim 3 wherein said spring assist is a torsion spring.

6. A rail-rubber mine car according to claim 3 wherein said yoke locking means comprises a lever and wherein said resilient biasing means is mounted about said lever and said locking lug is spaced from the pivot point on said lever.

7. A rail-rubber mine car according to claim 3 wherein spacers are provided on said axle to allow the car to be utilized on various track gauges.

8. A rail-rubber mine car according to claim 7 wherein said bed section is generally horizontal.

9. A rail-rubber mine car according to claim 8 wherein stakes are provided about the periphery of the bed section to allow various types of sides to be utilized on the car.

10. A rail-rubber mine car according to claim 9 wherein said bed comprises a channel section.

11. A rail-rubber mine car according to claim 8 wherein said bed includes sides for the car.

12. A rail-rubber mine car according to claim 11 wherein said sides comprise channel sections.

13. A rail-rubber mine car according to claim 4 wherein a spring plate is affixed to said yokes and wherein said spring plate engages said compression spring.

14. A rail-rubber mine car according to claim 13 wherein said spring plate comprises a generally horizontal portion and a vertical portion and wherein the vertical portion engages said spring.

15. A rail-rubber mine car according to claim 5 wherein said torsion spring is mounted within spaced vertical members and a transversely extending fixed member extends between said spaced vertical members and through an opening in said yokes.

16. A rail-rubber mine car according to claim 15 wherein the torsion spring member engages said transversely extending fixed member and a transversely extending tube which is affixed to said yokes.

17. A rail-rubber mine car according to claim 16 wherein said tube is located within a transversely extending housing which engages said yokes.

18. A rail-rubber mine car comprising: end and side members joined together to define a generally rectangular structure; a generally horizontal bed section affixed to said structure; a pair of transversely extending axles rotatably affixed to said structure; rail wheels affixed to said axles adapted to run on tracks; yokes having tires affixed thereto pivotally mounted along the sides of the car so as to face each other; a fixed locking member mounted on each of said side members at about the center of the car; said locking member having a contour to provide an engaging surface in a lower portion thereof and an engaging surface at an upper portion thereof; yoke locking means affixed to said yokes; said yoke locking means comprising a locking lug adapted to engage said fixed locking member in a lower position thereof whereby said tires are adapted to support said car on the ground or mine floor, and in an upper position whereby said tires are supported partly by the fixed locking member and said car is supported by said rail wheels; a spring assist assembly engaging said yokes and adapted to aid the operator in raising said tires and yokes to said upper position; said yoke locking means having resilient means biasing the same into the engaged positions on said fixed locking member.

19. A rail-rubber mine car comprising: end and side members joined together to define a generally rectangular structure; a generally horizontal bed section affixed to said structure; a pair of transversely extending axles rotatably affixed to said structure; rail wheels affixed to said axles adapted to run on tracks; said axles having spacers thereon to adapt said car to a desired track gauge; yokes having tires affixed thereto pivotally mounted along the sides of the car so as to face each other; a spring assist assembly mounted at the pivot end of said yokes adapted to assist a mine operator in raising said yokes and tires to a stored position; a fixed locking member mounted at about the center of the car on each of said side members; said locking member having a contour to provide an engaging surface in a lower portion thereof and an engaging surface at an upper portion thereof; yoke locking means affixed to said yokes; said yoke locking means comprising a lever having a pivot point, resilient means mounted on said lever urging a locking lug affixed to said lever spaced from said pivot point to engage said fixed locking member in a lower position thereof whereby said tires are adapted to support said car on the ground or mine floor, and in an upper position whereby said tires are supported partly by the fixed locking member and said car is supported by said rail wheels.

20. A rail-rubber mine car according to claim 19 wherein said spring assist is a compression spring.

21. A rail-rubber mine car according to claim 19 wherein said spring assist is a torsion spring.

22. A rail-rubber mine car according to claim 19 wherein said bed provides sides for the car.

23. A rail-rubber mine car according to claim 19 wherein said bed includes stakes to hold sides in place on the car.

24. A rail-rubber mine car according to claim 22 wherein said bed has channel sections which define the sides.

25. A rail-tubber mine car according to claim 19 wherein said rubber tires are free to move further in the vertical direction in the up position.

26. A rail-rubber mine car according to claim 19 wherein said rubber tires are free to move further in the vertical position in the event that the tires strike an object during transit.

* * * * *